(12) United States Patent
Dreese (10) Patent No.: US 6,264,288 B1
(45) Date of Patent: Jul. 24, 2001

(54) BRAKE SYSTEM FOR RAIL CARS

(75) Inventor: David F. Dreese, Hamburg, NY (US)

(73) Assignee: Miner Enterprises, Inc., Geneva, IL (US)

(*) Notice: Subject to any disclaimer, the term of this patent is extended or adjusted under 35 U.S.C. 154(b) by 0 days.

(21) Appl. No.: 09/345,022

(22) Filed: Jul. 2, 1999

(51) Int. Cl.⁷ ............................................. B60T 17/02
(52) U.S. Cl. .................................. 303/15; 303/3; 303/13; 303/20
(58) Field of Search .......................... 303/13, 15, 22.1, 303/22.2, 22.3, 22.7, 22.8, 28, 29, 30, 40, 74, 26, 41, 42, 32, 33, 35, 62, 67, 20; 188/195

(56) References Cited

U.S. PATENT DOCUMENTS

| | | | |
|---|---|---|---|
| 3,704,046 | * 11/1972 | Beacon | 303/22.8 |
| 4,653,812 | * 3/1987 | Engle | 303/22.2 X |
| 5,111,916 | * 5/1992 | Muller et al. | 303/15 X |
| 5,590,042 | * 12/1996 | Allen, Jr. et al. | 303/15 C |
| 5,934,764 | * 8/1999 | Dimsa et al. | 303/3 |
| 6,050,650 | * 4/2000 | Hart | 303/15 |

* cited by examiner

Primary Examiner—Robert J. Oberleitner
Assistant Examiner—Melanie Torres
(74) Attorney, Agent, or Firm—Greenwald & Basch LLP; Howard J. Greenwald (57) ABSTRACT

A brake system for rail cars which contains an air powered fluid system, a device for providing a separate source of brake force, and a manifold connected to the air powered fluid system and the device for providing a separate source of brake force; the manifold simultaneously delivers pressurized fluid to two movable cylinders under certain conditions and in response to fluid flow from either the air powered fluid system or the device for providing a separate source of brake force; but when both the device for providing a separate source of brake force and the air powered fluid system are delivering fluid flow to the manifold, the brake system contains a device for terminating the pressure from the separate source of brake force.

14 Claims, 6 Drawing Sheets

BRAKE SYSTEM FOR RAIL CARS

FIELD OF THE INVENTION

A brake system for rail cars comprising an intensifier, a spool valve, a pump, and at least two hydraulic or air cylinders.

BACKGROUND OF THE INVENTION

The rail network in North America is the largest in the world, operating with the high axle loads customarily used with heavy freight hauling railways. For many years there has been a trend in North America to use heavier and heavier freight cars. This trend has required designers of brake systems to attempt to pack more and more brake performance into a smaller and smaller space.

In a paper presented at the September, 1971 Annual Meeting of the Air Brake Association (1971). Thomas H. Engle, Senior Project Engineer of the New York Air Brake Company (of Starbuck Avenue, Watertown, N.Y.) disclosed that "About four years ago, our Company decided that in the long run the best solution for this squeeze would be a hydro-pneumatic braking system which included both hand and power braking, and which would use a mechanical lock on the handbrake so as to hold a car, on which handbrakes had been applied, even in the absence of hydraulic pressure."

In 1972, U.S. Pat. No. 3,707,309 was issued to Mr. Engle. This patent claimed a fluid operated brake system for a railway car which comprised a hydraulic hand brake control unit which had to be manually activated and deactivated. Failure to deactivate the control unit at the appropriate time causes the brakes to maintain contact with the wheels, thus increasing wear and tear upon the system and leading to premature failure.

By no later Mar. 16, 1976, when U.S. Pat. No. 3,944,286 issued to Thomas H. Engle, there existed, according to such patent, " . . . railway regulations which require a crewman to move or confirm all parking brakes to an 'OFF' position . . . . " The patent disclosed that "The prior art systems . . . may create problems in use since it is frequently the case that the parking brake has not been fully unlocked and released by a crewman before an attempt is made to move the car. Obviously, this can cause numerous delays to locate the stuck brakes, undue brake wear if some movement does occur and similar deleterious effects." The solution to this problem presented in this patent was to provide a brake system which first required a crewman to release the parking brake of a particular car. The patentees disclosed that "If, however, the crewman has failed to even partially release the parking brake of a particular car, the booster 70 will be ineffective to release either the brake or the brake locking mechanism."

Some twenty-three years later on, when Thomas H. Engle's U.S. Pat. No. 5,746,293 issued in May of 1998, the problems discussed in his earlier patents had not been solved. Thus, as is disclosed at lines 50–55 of column 1 of this 1998 Engle patent, " . . . these hand brakes have been a source of problems. This is particularly the case when such hand brakes are not released when a train consist is ready to move over the tracks . . . . "

About the same time that U.S. Pat. No. 5,746,293 issued to Mr. Engle, U.S. Pat. No. 5,767,973 issued to Hans J. Naumann. This latter patent disclosed that " . . . the rail network in the North America is . . . characterized by an inordinately high number of railroad accidents and derailments; these incidents occur at a substantially higher rate in North America than anywhere else in the world."

Applicant believes that one of the causes of this problem is a failure to properly operate and maintain the braking systems on rail cars. Such lack of proper operation and maintenance is often due to the complexity of such systems, difficulty of access to the components in such systems, and the lack of readily apparent visual indicators warning of system status.

It is an object of this invention to provide a brake system which is substantially safer and more reliable than prior art brake systems.

It is another object of this invention to provide a brake system which allows ready visual access to determine whether the brakes are disengaged.

It is yet another object of this invention to provide a brake system which can readily be attached to conventional railway trucks.

It is yet another object of this invention to provide a brake system which can readily be removed from conventional railway trucks for service.

It is yet another object of this invention to provide a brake system which automatically disengages a hand brake upon application of a train's service brake.

It is yet another object of this invention to provide a brake system which is relatively lightweight, small, and inexpensive.

It is yet another object of this invention to provide a brake system which can be used with a railway truck and a railway car.

It is yet another object of this invention to provide a brake system which will require substantially less maintenance than prior art braking systems, less time to do such maintenance, and less expense to do such maintenance.

SUMMARY OF THE INVENTION

In accordance this invention, there is provided a brake system for rail cars comprised of an intensifier, a spool valve connected to said intensifier, a pump connected to said spool valve, a first cylinder connected to said spool valve, and a second cylinder connected to said spool valve.

BRIEF DESCRIPTION OF THE DRAWINGS

The claimed invention will be described by reference to the specification and to the following drawings, in which like numerals refer to like elements, and in which:

DESCRIPTION OF THE PREFERRED EMBODIMENTS

Figure 1:
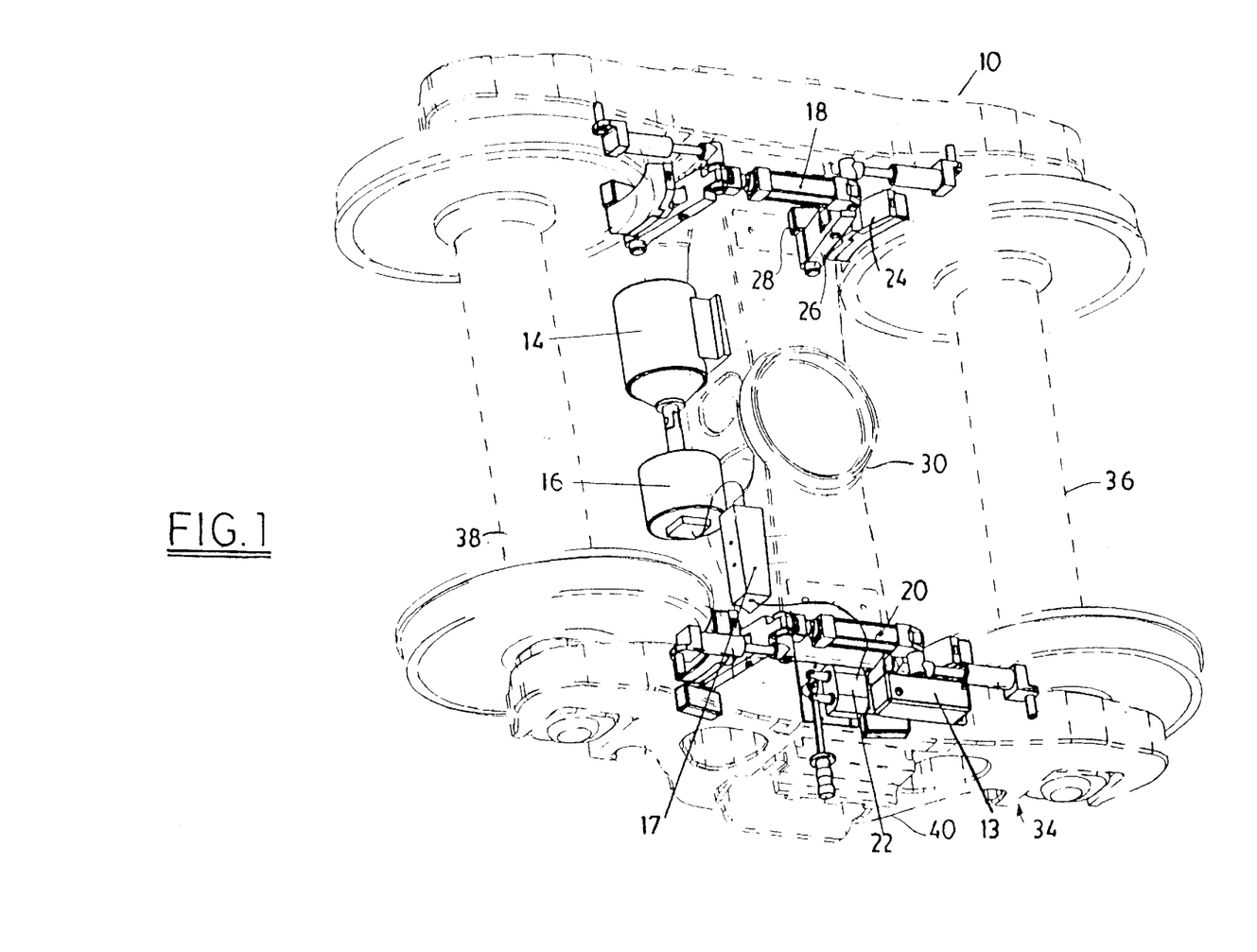
FIG. 1 is a schematic view of one preferred brake apparatus of the invention mounted on a railway truck.

FIG. 1 is a perspective view of a railway truck 10 onto which, in the preferred embodiment depicted, a brake system is mounted. In the embodiment depicted, the brake system is comprised of hydraulic fluid reservoir 13, air master cylinder 14, fluid master cylinder 16, spool valve 17, first hydraulic cylinder 18, second hydraulic cylinder 20, hand pump 22, brake head 24, brake lever 26, and pin block 28.

As will be appreciated by those skilled in the art, the hand pump 22 is but one preferred independent means of providing a separate source of brake force, commonly used for parking cars when no air pressure is available at cylinder 14. One may use other means, manually and/or automatically operated, for applying force to the brakes. It is preferred, in general, that these other means include an air or hydraulic cylinder powered by one or more suitable activation means, which may be manual or automatic.

In one embodiment, not shown, the hand pump 22 is replaced with an air or hydraulic cylinder powered by an alternate or remotely applied force. Thus, by way of illustration, a series of railroad cars make have a multiplicity of brake systems, each with a pump 22 centrally operated and controlled from one location.

In the embodiment depicted in FIG. 1, the brake system is mounted onto a railway truck 10. As is known to those skilled in the art, a railway truck supports one end of a rail car and generally is comprised of bolster 30, side frame 32, side frame 34, wheel assembly 36, wheel assembly 38, and suspension springs 40. Railway trucks and their associated braking systems are well known to those skilled in the art and are described, e.g., in U.S. Pat. Nos. 5,040,466, 4,981,082, 4,907,514, 4,844,554, 4,838,174, 4,766,818, 4,679,506, 4,669,391, 4,630,715, 4,428,301, and the like. The disclosure of each of these United States patents is hereby incorporated by reference into this specification.

In another embodiment, not shown, the reservoir 13, the intensifier (comprised of elements 14 and 16), the spool valve 17, and the pump 22 can be mounted on the associated railway car and hydraulically connected to the remaining components on the railway truck 10. In yet another embodiment, the reservoir 13 can be mounted on bolster 30. As will apparent to those skilled in the art, it does not matter where these components are located as long as they are operatively connected to each other.

Figure 2:
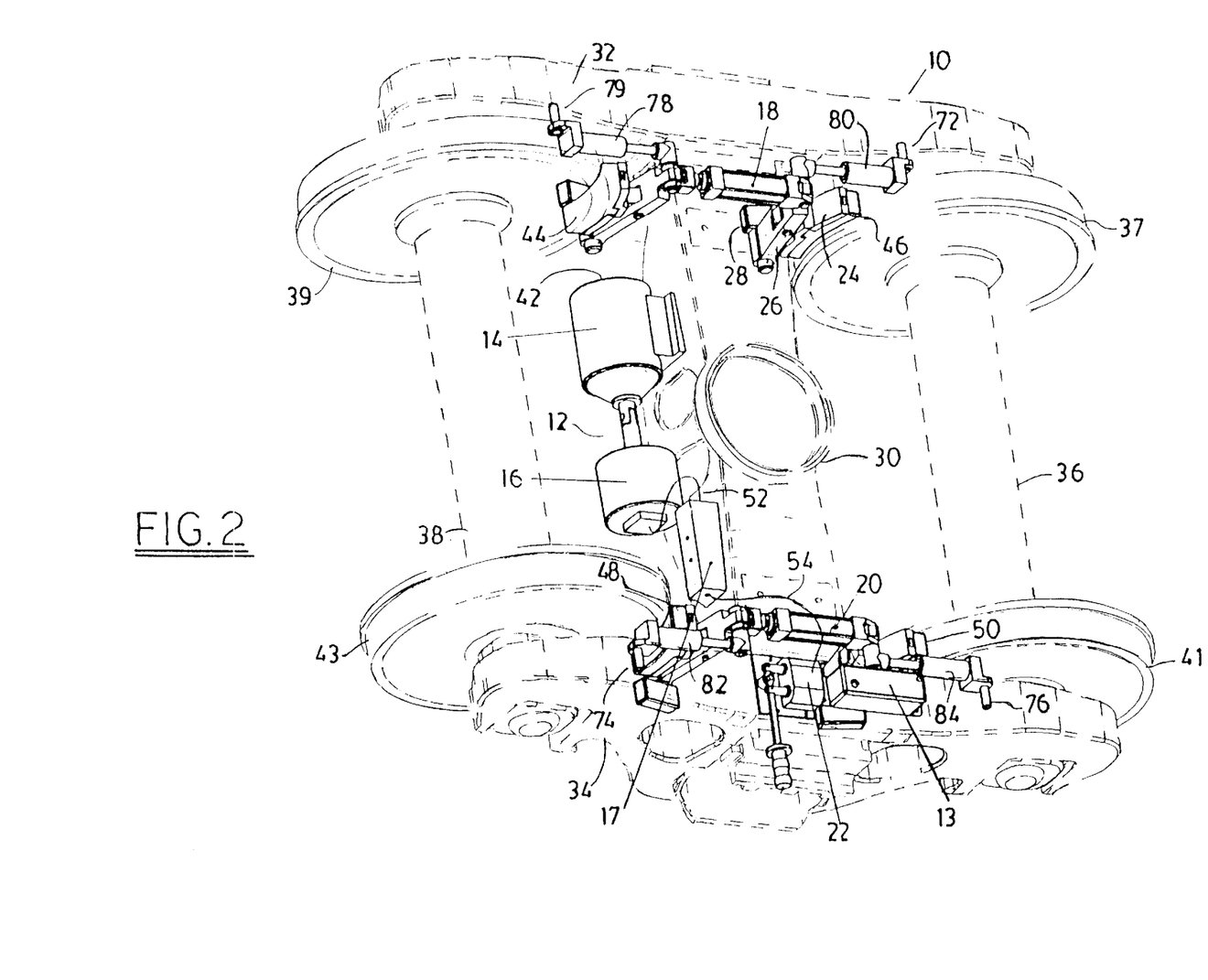
FIG. 2 is a schematic view of the brake apparatus of FIG. 1, showing the position of its components vis-a-vis the railway truck.

FIG. 2 also is a perspective view of railway truck 10 onto which the components of the preferred brake system 12 are mounted. Referring to FIG. 2, air from an air reservoir (not shown) is fed to air master cylinder 14 and hydraulic master cylinder 16, which collectively act as an intensifier. In general, an air line (not shown) is connected from one railway car to another; whenever the pressure in such air line drops below a predetermined value, air is fed from an air reservoir (not shown) to the line 42 to provide the desired air pressure to the system.

Under stable conditions, a constant pressure is applied via line 42 to elements 14 and 16. When the brakes 44, 46, 48, and 50 are off, the air pressure in line 42 is atmospheric pressure, generally about 14.7 pounds per square inch. When the brakes 44, 46, 48, and 50 are to be applied, a switch (not shown) is activated which reduces the pressure in the air line connecting the railway cars. The reduced pressure state causes the air reservoir (not shown) to feed air into line 42, thereby increasing the pressure in such line to a predetermined value, depending upon the size of the railway truck, often from about 40 to about 70 pounds per square inch.

In the preferred embodiment depicted, air master cylinder 14 and hydraulic master cylinder 16 collectively act as an intensifier, whose function is to convert the increased air pressure within line 42 to hydraulic pressure; many such intensifiers comprise only one integral element. These intensifier units are often referred to as "boosters" or "air powered hydraulic pumps" or "air powered hydraulic systems" or "air powered hydraulic intensifiers." They are well known in the art and are described, e.g., in U.S. Pat. Nos. 5,782,158, 5,772,289, 5,724,852, 5,634,778, 5,375,814, 5,303,643, 5,290,140, 5,271,881, 5,242,358, 4,993,226, 4,784,579, 4,773,222, 4,582,278, 4,011,724, and the like. The disclosure of each of these United States patents is hereby incorporated by reference into this specification.

One such intensifier, which is referred to as a pneumatic/hydraulic pressure intensifier, is disclosed in U.S. Pat. No. 5,746,293, the entire disclosure of which is hereby incorporated by reference into this specification.

It is preferred that the intensifier, which comprises air cylinder 14 and hydraulic cylinder 16, be capable of converting from about 50 to about 75 pounds per square inch of air pressure into an output hydraulic pressure of from about 500 to about 2,000 pounds per square inch. The ratio of the hydraulic pressure produced by the intensifier to the input air pressure should preferably be from about 5/1 to about 25/1 and, in one embodiment, is from about 8/1 to 17/1.

For the sake of simplicity of representation, applicant has depicted the intensifier used in his device as being comprised of two separate units, air cylinder 14 and hydraulic cylinder 16. As is well known to those skilled in the art, the commercially available intensifier units are often sold as one integral package whose elements provide several different functions. These commercially available intensifiers, as long as they provide the degree of pressure amplification required, may be used in the device of this invention.

In one embodiment, hydraulic cylinder 16 is an air cylinder.

Referring again to FIG. 2, the hydraulic fluid under amplified pressure is fed via line 52 to spool valve 17. As is known to those skilled in the art, a spool valve is a slide-type hydraulic valve in which the movable part is a "spool." These valves, and their use in brake systems, are well known and are described, e.g., in U.S. Pat. No. 5,882,089, 5,836,845, 5,711,584, 5,624,164, 5,547,264, 5,442,916, 5,417,480, 5,328,002, 5,323,688, 5,188,002, 5,141,293, 5,123,712, and the like. The disclosure of each of these United States patents is hereby incorporated by reference into this specification.

Hydraulic logic circuits for controlling spool valves, and their outputs, are well known. One such logic circuit is disclosed in U.S. Pat. No. 4,201,277 of Bruno Meier et al. In this patent, hydraulic activators are provided with a relief valve which serves to permit communication between a disengaging cylinder chamber and a work cylinder chamber. The open position of the relief valve occurs when the release apparatus for the rotatable friction brake member is closed. The closed position of the relief valve occurs after the rotating brake is released. The entire disclosure of this patent is hereby incorporated by reference into this specification.

Other hydraulic logic circuits for controlling spool valves are disclosed, e.g., in U.S. Pat. Nos. 5,218,997, 4,811,650, 4,812,789, 4,154,261, and the like. The disclosure of each of these United States patents is hereby incorporated by reference into this specification. Furthermore, the spool valves can be replaced, in part or whole, by other hydraulic control valves performing the same function.

Referring again to FIG. 2, it will be seen that spool valve 17 is hydraulically conneced to both hydraulic cylinder 16 (via line 52), and to hand pump 22 (via line 54).

Spool valve 17 has outputs 56, 58, 60, and 62. For the sake of simplicity of representation, the circuit logic involving spool valve 17 is schematically illustrated in FIG. 2A.

Figure 2A:
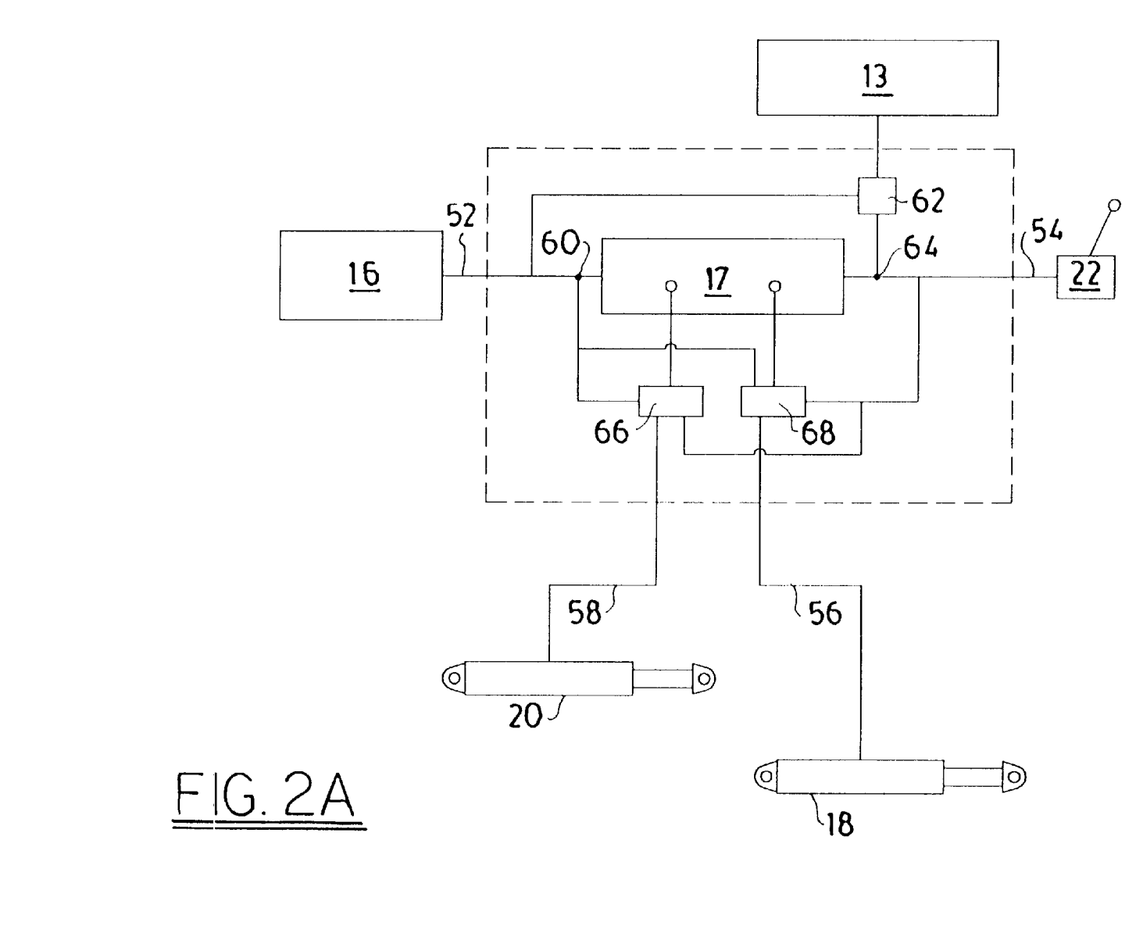
FIG. 2A is a schematic of a hydraulic circuit involving a spool valve of the brake apparatus.

Referring to FIG. 2A, it will be seen that spool valve 17 is capable of feeding hydraulic fluid via lines 56 and 58 to hydraulic cylinders 18 and 20, respectively. Such fluid flow will cause these hydraulic cylinders to move in a manner such that they will activate the brakes, as will be discussed in more detail later in this specification.

The fluid flow through lines 56 and 58 can be caused by means of fluid from hydraulic cylinder 16, which is caused to flow because of air pressure in air cylinder 14. As is discussed elsewhere in this specification, this fluid flow occurs when the service brake is applied by the engineer; and it flows through both of lines 56 and 58 to cylinders 18 and 20.

The activation of hand pump 22 will also cause fluid flow through lines 56 and 58 and the resultant movement of cylinders 18 and 20.

When the pressure applied by the hand pump 22 is equal to the pressure applied through line 52, then the spool within spool valve 17 will not move, and no fluid will flow to either cylinder 18 or cylinder 20.

If no service brake is applied by the engineer, then no fluid will flow through line 52. In that case, fluid flowing though line 54 because of the use of hand pump 22 will cause the spool to move within valve 17 and the resultant movement of cylinders 18 and 20.

If, however, the service brake is applied by the engineer, the system is designed in such manner that the pressure exerted through line 52 upon the spool will always be greater than the pressure exerted upon the spool through line 54. Thus, when the service brake is applied and the hand brake is not applied, such pressure will cause the movement of cylinders 18 and 20. When both the service brake is applied and the hand brake is applied, cylinders 18 and 20 will still move because of the greater pressure from line 52. Furthermore, a pressure sensor disposed within line 52 at point 60 will sense the increased the pressure in such line and cause a pressure controller 62 to open a valve in line 54 located at point 64 and to release pressure back into pump 22.

The schematic of FIG. 2A provides one means for releasing the pressure in line 54 when the pressure in line 52 exceeds a certain specified value. It is only one of many possible means of achieving this end, all of which are within the scope of this invention.

In the preferred embodiment depicted in FIG. 2A, an isolation valve 66 is disposed within line 58, and an isolation valve 68 is disposed within line 56.

When the pressure at point 60 exceeds a certain specified value, then isolation valves 66 and 68 allow high pressure fluid to flow back into the system. However, until and unless the pressure at point 60 exceeds such as specified value, the system will only allow forward flow in lines 56 and 58 unless and until the pressure in the cylinders 18 and 20 is manually released back into the system by means of a release valve (not shown). When such forward flow has achieved the objective of moving the cylinders 18 and 20 to the desired extent, isolation valves 66 and 68 will close and not allow flow in either direction until and unless it senses the pressure in line 52 has exceeded the aforementioned specified level.

Referring again to FIG. 2, it will be seen that the hydraulic cylinders 18 and 20 are disposed above the bolster 30, thus being removed to some degree from the risk of contact with moving debris from the wheels of the truck. As will be apparent to those skilled in the art, the bolster 30 moves up and down on springs 40. The hydraulic cylinders 18 and 20 are sufficiently spaced that, even at the maximum height of bolster 30, it will not contact either of such cylinders. In general, when the truck 10 is motionless, the hydraulic cylinders 18 and 20 are at least about 2 inches above the bolster 30 when the truck is unloaded.

Referring again to FIG. 2, attachment pins 70, 72, 74, and 76 are adapted to engage the slack adjusters 78, 80, 82, and 84. These slack adjusters are shown in greater detail in FIG. 3.

Figure 3:
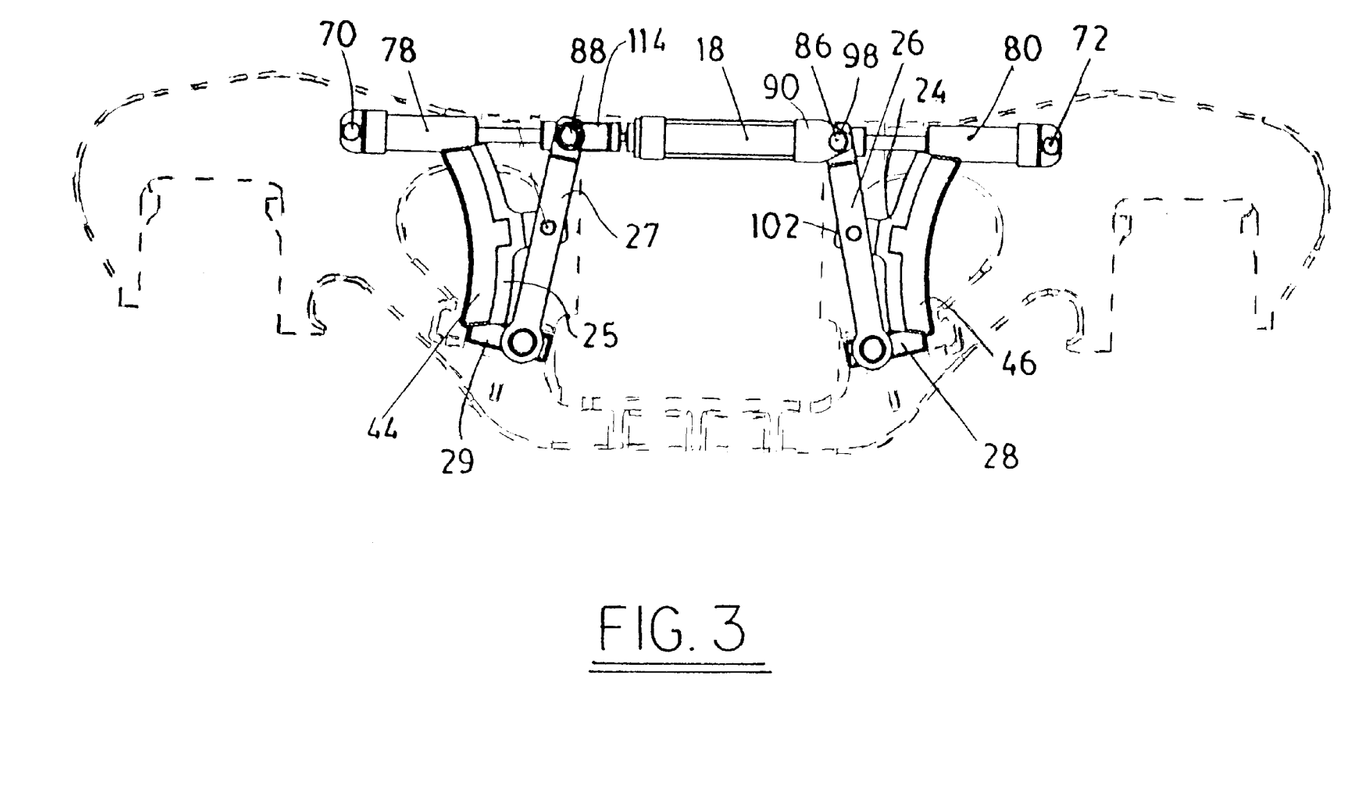
FIG. 3 is a partial side view of the brake apparatus of FIG. 2.
Figure 4:
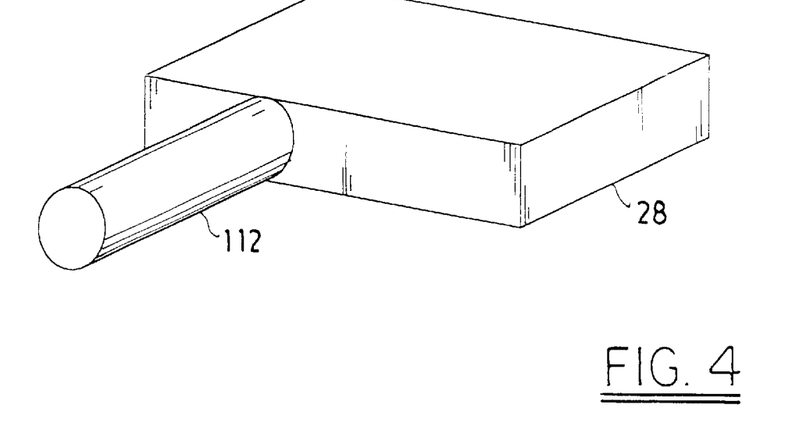
FIG. 4 is a schematic view of a pin block which may be used in conjunction with the apparatus of FIG. 1.

FIG. 3 is a side view of the side frame 32 (see FIG. 2). It will be appreciated the side frame on the other side of the truck, side frame 34, will have a similar configuration.

Referring to FIG. 3, it will be seen that cylinder 18 is connected to lever arm 26 at point 86. The structure of lever arm 26 is shown in greater detail in FIG. 5.

Figure 5:
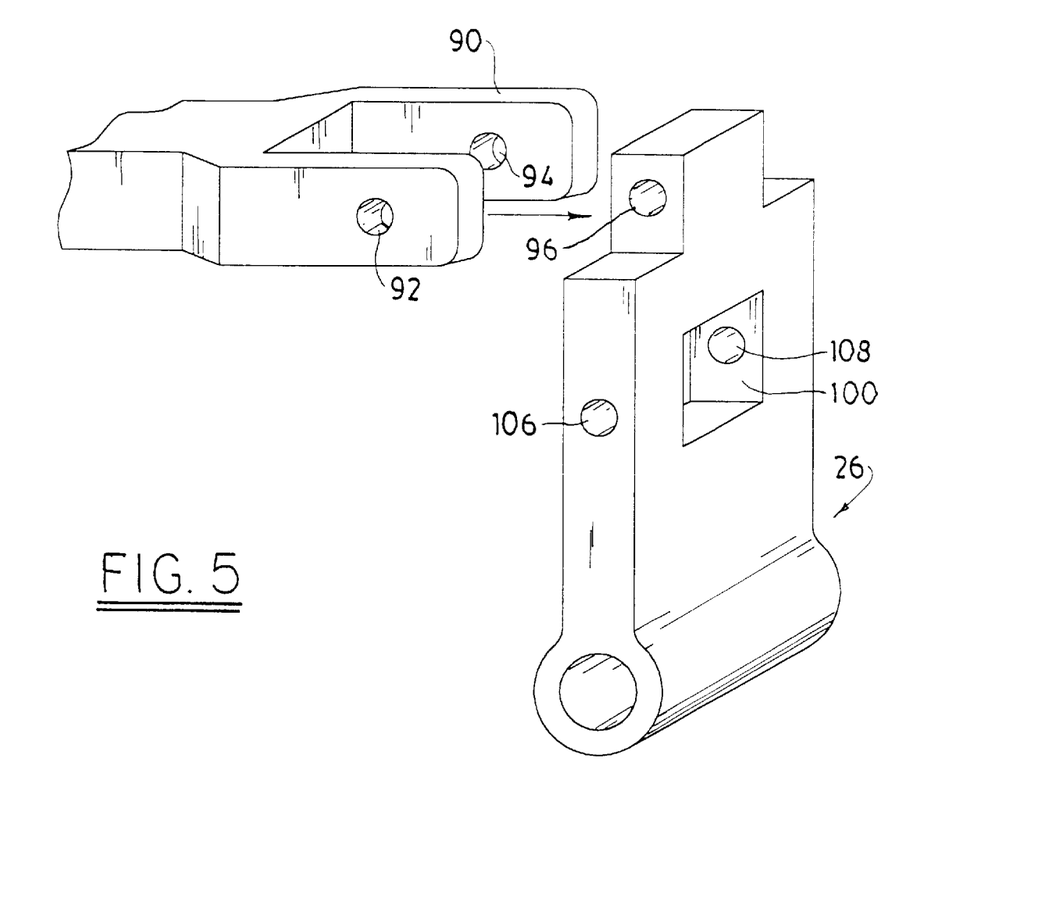
FIG. 5 is a perspective view of a brake lever and clevis which may be used in conjunction with the pin block of FIG. 4.
Figure 6:
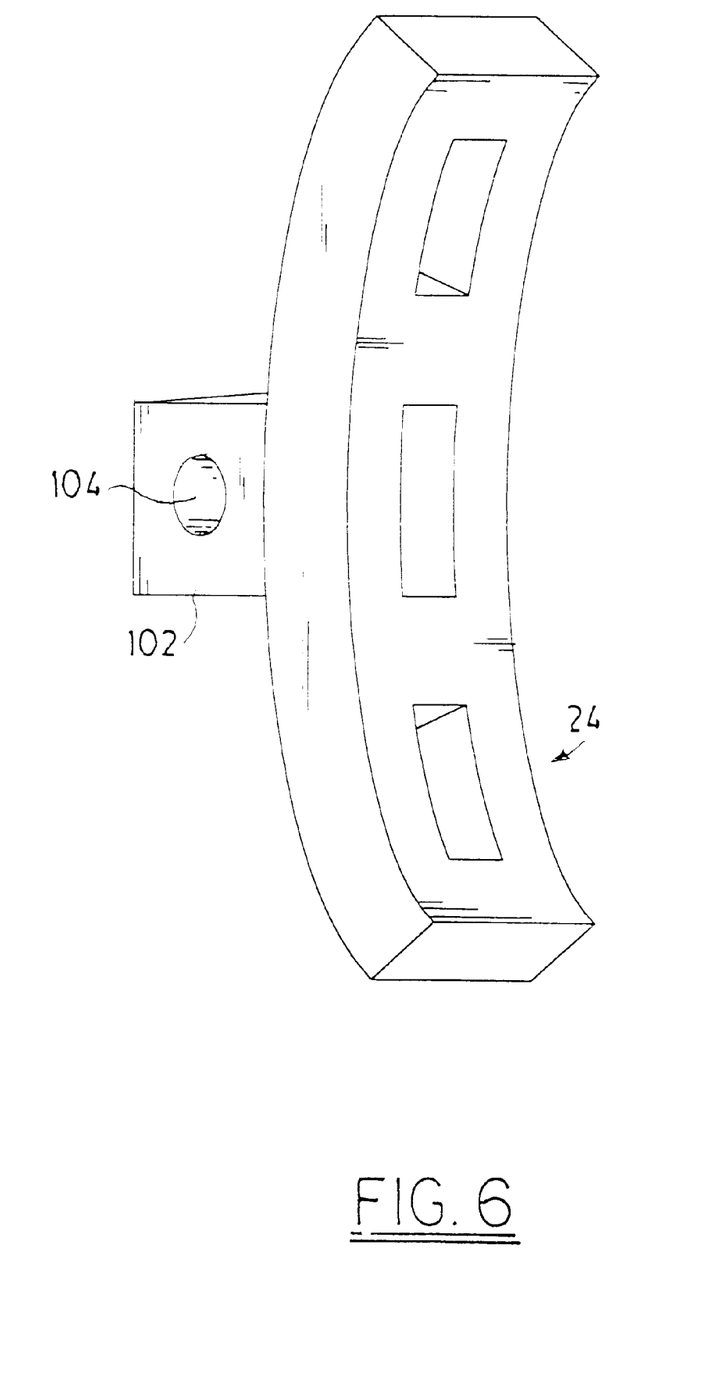
FIG. 6 is a perspective view of a brake head.

Referring to FIG. 5, a clevis 90, attached to cylinder 18 and equipped with orifices 92 and 94, is aligned with orifice 96 of lever arm 26 and is removably attached thereto by means of a pin 98 (see FIG. 3). Rectangular orifice 100 of lever arm 26 is adapted to receive rectangular protrusion 102 of brake head 24 (see FIG. 6). The rectangular protrusion 102 is comprised of an orifice 104 adapted to be aligned with the orifices 106 and 108 of lever arm 26 (see FIG. 5); and, when so aligned, the lever arm 26 may be removably attached to the brake head 24 by means of a pin.

Referring again to FIG. 5, lever arm 26 is also comprised of an orifice 110 which is adapted to receive rod 112 of pin block 28.

The connection of lever arm 26 to the hydraulic cylinder 18, the brake head 24, and the pin block 28 is similar to the connection of lever arm 27, the free rod end of hydraulic cylinder 18, the brake head 25, and the pin block 29.

As will be apparent to those skilled in the art, these connections allow brake heads 24 and 25 to self align to the wheels 37, 39, 41, and 43 (see FIG. 2). This phenomenon allows brake pads 44 and 46 to rotate into positions wherein they are in full contact with the wheels.

It will be apparent that many other designs may be used that will accomplish the same function. Furthermore, spring force or other means (not shown) can be introduced at the various connection points to accommodate tolerances and to balance forces or moments to maintain the shoe 46 in proper relation to the wheel 37.

Referring again to FIG. 3, it will be seen that slack adjusters 78 and 80 are connected to hydraulic cylinder 18, one for limiting movement in one direction, the other for limiting movement in the other direction. These slack adjusters are well known in the railway art and are described, e.g., in U.S. Pat. Nos. 5,813,771, 5,615,755, 5,476,269, 5,465, 816, 5,253,736, 5,246,081, 5,197,373, 5,067,872, 4,973,206, 4,683,991, 4,676,346, 4,662,485, 4,646,882, 4,530,422, 4,498,711, 4,497,392, 4,457,407, 4,420,066, and the like. The entire description of each of these United States patents is hereby incorporated by reference into this specification.

Furthermore, in the preferred embodiments depicted, the levers, slack adjusters, and cylinders are supported by and forces reacted into the side frames. An alternate means could have these elements supported by the bolster and/or by another structure.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

In one embodiment, the air powered fluid system, instead of producing a hydraulic flow at an increased pressure in response to an air flow at a lesser pressure, produces a fluid flow at an increased pressure in response to the an air flow at a lesser pressure. The term fluid, as used in this specification, is intended to encompass both air and liquid material.

The spool valve referred to in this specification acts as a manifold, directing fluid flow to certain locations in response to certain conditions. Other manifolds may also be used, and other valves than spool valves may also be used.

The hydraulic cylinders referred to in this specification are but one means of providing linear movement in response to the flow of fluid under pressure. Other devices, such as other movable cylinders, also may be used.

I claim:

1. A brake system for rail cars, comprising:
    (a) an air powered fluid system with an inlet port and an outlet port for for producing a first flow of hydraulic fluid under pressure at said output port of said air powered fluid system in response to an air flow under pressure supplied to said inlet port,
    (b) means for producing a second flow of fluid under pressure,
    (c) a manifold connected to said output port and to said means for producing a second flow of fluid under pressure, wherein:
        1. said manifold contains means for simultaneously delivering said first flow of fluid under pressure to each of a first movable cylinder and a second movable cylinder when said first flow of fluid is at a first specified level of pressure,
        2. said manifold contains means for simultaneously delivering said second flow of fluid under pressure to each of said first movable cylinder and said second movable cylinder when said first flow of fluid is at a pressure lower than a second specified level of pressure,
        3. said brake system comprises means for terminating the said second flow of fluid under pressure to said manifold whenever air flow greater than a third specified level of pressure is being supplied to said inlet port,
    (d) a first slack adjuster and a second slack adjuster attached to said first movable cylinder, and
    (e) a third slack adjuster and a fourth slack adjuster attached to said second movable cylinder.

2. The brake system as recited in claim 1, wherein said second flow of fluid is a second flow of hydraulic fluid.

3. The brake system as recited in claim 2, wherein said first movable cylinder is a first hydraulic cylinder.

4. The brake system as recited in claim 3, wherein said second movable cylinder is a second hydraulic cylinder.

5. The brake system as recited in claim 4, wherein said manifold is a valve.

6. The brake system as recited in claim 5, wherein said valve is a spool valve.

7. A brake system for rail cars, comprising:
    (a) an air powered fluid system with an inlet port and an outlet port for for producing a first flow of fluid under pressure at said output port of said air powered fluid system in response to an air flow under pressure supplied to said inlet port,
    (b) means for producing a second flow of fluid under pressure,
    (c) a manifold connected to said output port and to said means for producing a second flow of fluid under pressure, wherein:
        1. said manifold contains means for simultaneously delivering said first flow of fluid under pressure to each of a first movable cylinder and a second movable cylinder when said first flow of fluid is at a first specified level of pressure,
        2. said manifold contains means for simultaneously delivering said second flow of fluid under pressure to each of said first movable cylinder and said second movable cylinder when said first flow of fluid is at a pressure lower than a second specified level of pressure,
        3. said brake system comprises means for terminating the said second flow of fluid under pressure to said manifold whenever air flow greater than a third specified level of pressure is being supplied to said inlet port,
    wherein said brake system is attached to a railway truck comprised of a bolster, a first side frame, a second side frame, a first wheel assembly, and a second wheel assembly.

8. The brake system as recited in claim 7, wherein said first movable cylinder is disposed above said bolster.

9. The brake system as recited in claim 8, wherein said second movable cylinder is disposed above said bolster.

10. The brake system as recited in claim 1, wherein said air powered fluid system is comprised of means for converting an air flow under a pressure of from about 50 to about 75 pounds per square inch which is fed into said inlet port into a fluid flow with a pressure of from about 500 to about 2,000 pounds per square inch which is fed out of said outlet port.

11. The brake system as recited in claim 10, wherein the ratio of said pressure of said fluid flow to the pressure of said air flow is from about 5/1 to about 25/1.

12. A brake system for rail cars, comprising:
    (a) an air powered fluid system with an inlet port and an outlet port for for producing a first flow of fluid under pressure at said output port of said air powered fluid system in response to an air flow under pressure supplied to said inlet port,
    (b) means for producing a second flow of fluid under pressure,
    (c) a manifold connected to said output port and to said means for producing a second flow of fluid under pressure, wherein:
        1. said manifold contains means for simultaneously delivering said first flow of fluid under pressure to each of a first movable cylinder and a second movable cylinder when said first flow of fluid is at a first specified level of pressure,
        2. said manifold contains means for simultaneously delivering said second flow of fluid under pressure to each of said first movable cylinder and said second movable cylinder when said first flow of fluid is at a pressure lower than a second specified level of pressure, 3. said brake system comprises means for terminating the said second flow of fluid under pressure to said manifold whenever air flow greater than a third specified level of pressure is being supplied to said inlet port, wherein said first movable cylinder is connected to a first lever arm.

13. The brake system as recited in claim 12, wherein said second movable cylinder is connected to a second lever arm.

14. The brake system as recited in claim 13, wherein each of said first and second lever arms is comprised of a substantially rectangular orifice.

\* \* \* \* \*